UNITED STATES PATENT OFFICE.

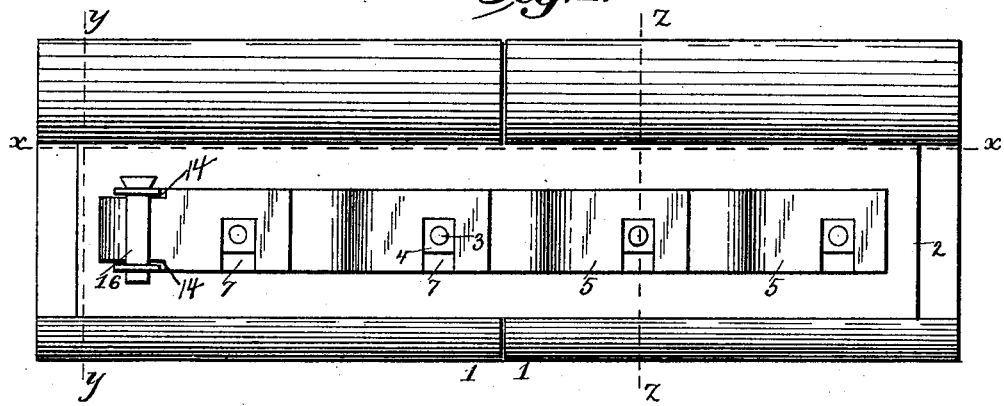

WILLIAM A. HONECKER, OF TOUGALOO, MISSISSIPPI, ASSIGNOR OF ONE-HALF TO T. D. JOHNSON, OF SAME PLACE.

NUT-LOCK.

SPECIFICATION forming part of Letters Patent No. 594,950, dated December 7, 1897.

Application filed August 23, 1897. Serial No. 649,196. (No model.)

*To all whom it may concern:*

Be it known that I, WILLIAM A. HONECKER, a citizen of the United States, residing at Tougaloo, in the county of Hinds and State of Mississippi, have invented a new and useful Nut-Lock, of which the following is a specification.

This invention relates to nut-locks of that class in which a series of adjacent nuts are locked by a series of overlapping plates, each of which plates is locked in position by the succeeding plate; and the object of my invention is to provide a simple and efficient means for securing the last plate in its position.

With this object in view the invention consists in the several details of construction and combination of parts, all as will be hereinafter fully described, and particularly pointed out in the claims.

In the drawings, Figure 1 is a side elevation of a portion of two railroad-rails joined by fish-plates and secured by bolts and nuts with my invention applied thereto. Fig. 2 is a horizontal section on the line *x x* of Fig. 1. Fig. 3 is a vertical section on the line *y y*. Fig. 4 is a vertical section on the line *z z* of Fig. 1.

Similar reference-numerals indicate similar parts in the several figures.

The two rails are indicated by 1, and the fish-plates by 2.

The numeral 3 indicates the bolts, and 4 the nuts secured on said bolts.

The plates which form the nut-locks, with the exception of the last two, are indicated by 5. Each of these plates is offset, as indicated at 6, in order that the front end portion of a plate may overlap the rear end portion of the preceding plate. The front portion of each plate is provided with a wrench-opening 7, and the rear portion with a bolt-receiving aperture 8. The wrench-shaped opening 7 may be of any desired shape to correspond with the shape of the nuts to be locked, and these openings are intended to receive the nuts in order to lock them against turning in either direction. It will be seen that each of these plates constitutes a nut-lock for the nut on one bolt and a washer for the succeeding bolt.

9 indicates a washer-plate which fits over the first bolt of the series in order that the succeeding plates may be properly fitted into position. The last plate of the series is indicated by 10 and the one preceding it by 11. The plate 11 is similar in form to the plates 5, except that its rear portion is extended and provided with two outwardly and horizontally projecting ears 12. Each of these ears is provided with a perforation 13, for a purpose to be hereinafter referred to. The plate 11 is provided with a wrench-shaped opening 7 and the bolt-receiving opening 8 in the same manner as the plates 5, and the bolt-receiving opening in this plate is for the reception of the last bolt in the series. The lock-plate 10 is provided with a wrench-shaped opening 7, adapted to receive the last nut in the series, and the rear end of this plate is reduced and provided with shoulders 14. The reduced end fits between the ears 12 on the plate 11, and the shoulders engage the edges of the ears. The end of the plate 10 is bent downwardly, as indicated at 15, to abut against the rear end of the plate 11. A key 16 extends through the perforations 13 in the ears 12 and bears against the front face of the plate 10 and thereby securely locks the said plate in position. The key may be secured in the ears 12 in any suitable manner.

In applying my invention to the nuts the washer 9 will be fitted over the first bolt of the series, and the nut on this bolt will then be screwed home. The first plate 5 will then be placed in position with its wrench-engaging opening fitting over the nut on the first bolt and its bolt-receiving aperture fitted over the second bolt in the series, after which the nut on the second bolt will be screwed home. The succeeding plates, which form nut-locks and washers, will then be applied in a similar manner. After the last nut in the series has been screwed into position the terminal plate will have its wrench-engaging surface fitted over the said nut and its rear end fitted between the ears 12, after which the key 16 will be secured in place and thereby effectually lock the last plate in its position.

In order to remove the locking-plates from nuts, it will only be necessary to force the key out of the ears 12, when the plates may be successively removed, as will be readily understood.

While I have illustrated and described my invention in connection with the bolts used to secure fish-plates in place, it is to be understood that it is equally applicable to a series of bolts used in any other connection, and it is also to be understood that changes in the form, proportion, and minor details of construction may be resorted to without departing from the spirit or sacrificing any of the advantages of this invention.

Having thus described the invention, what I claim is—

1. A nut-locking device consisting of a series of overlapping plates each of which forms a lock for a nut and a washer for the succeeding bolt, the last of said nut-lock and washer plates having outwardly and horizontally extending ears on its rear end, and a terminal plate to lock the last nut in the series the rear end of which plate fits between the said ears and is provided with shoulders to engage their inner edges, and a locking-key extending through said ears and engaging the front face of the terminal plate, substantially as described.

2. A nut-locking device consisting of a series of overlapping plates each of which forms a lock for a nut and a washer for the succeeding bolt, the last of said nut-lock and washer plates having outwardly and horizontally extending ears on its rear end, and a terminal plate to lock the last nut in the series, the rear end of said plate being reduced in width to fit between said ears and provided with shoulders to engage the edges of said ears, and the extreme rear end of said plate being bent inwardly to engage the rear end of the last nut-lock and washer plate, and a locking-key extending through said ears and engaging the front face of the terminal plate, substantially as described.

In testimony that I claim the foregoing as my own I have hereto affixed my signature in the presence of two witnesses.

WILLIAM A. HONECKER.

Witnesses:
   D. H. HOLDER,
   O. J. WAITE.